(12) United States Patent
Wei et al.

(10) Patent No.: US 8,280,930 B1
(45) Date of Patent: Oct. 2, 2012

(54) OBTAINING CONFIGURATION INFORMATION FROM HOST DEVICES WHICH STORE DATA INTO AND LOAD DATA FROM A DATA STORAGE ARRAY

(75) Inventors: Xiaoyan Wei, Shrewsbury, MA (US); Neil F. Schutzman, Marlborough, MA (US); Russell Laporte, Webster, MA (US); Feng Zhou, Framingham, MA (US); Greg Lazar, Upton, MA (US); Kevin Stephen Labonte, North Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 752 days.

(21) Appl. No.: 12/339,528

(22) Filed: Dec. 19, 2008

(51) Int. Cl.
    G06F 12/00 (2006.01)
    G06F 11/00 (2006.01)
(52) U.S. Cl. ......................................... 707/822; 370/225
(58) Field of Classification Search .................. None
    See application file for complete search history.

(56) References Cited

U.S. PATENT DOCUMENTS

| | | | | |
|---|---|---|---|---|
| 5,751,967 A * | 5/1998 | Raab et al. | | 709/228 |
| 5,903,913 A | 5/1999 | Ofer et al. | | |
| 5,938,764 A | 8/1999 | Klein | | |
| 6,480,953 B1 * | 11/2002 | Hughes | | 713/1 |
| 6,877,016 B1 | 4/2005 | Hart et al. | | |
| 6,944,654 B1 * | 9/2005 | Murphy et al. | | 709/223 |
| 7,023,869 B2 | 4/2006 | Barrow et al. | | |
| 7,200,641 B1 * | 4/2007 | Throop | | 709/217 |
| 7,307,948 B2 * | 12/2007 | Infante et al. | | 370/225 |
| 7,555,569 B1 | 6/2009 | O'Hare | | |
| 7,617,257 B2 | 11/2009 | Sathyanarayan et al. | | |
| 7,620,774 B1 | 11/2009 | Waxman | | |
| 7,653,712 B1 | 1/2010 | Dubrovsky et al. | | |
| 7,886,031 B1 * | 2/2011 | Taylor et al. | | 709/221 |
| 8,006,059 B1 * | 8/2011 | Clayton-Luce | | 711/170 |
| 2003/0065902 A1 * | 4/2003 | Shiga et al. | | 711/170 |
| 2005/0234941 A1 * | 10/2005 | Watanabe | | 707/100 |
| 2006/0277383 A1 * | 12/2006 | Hayden et al. | | 711/170 |
| 2008/0174426 A1 * | 7/2008 | Hackworth et al. | | 340/540 |
| 2010/0153703 A1 * | 6/2010 | Dodgson et al. | | 713/153 |
| 2011/0153697 A1 * | 6/2011 | Nickolov et al. | | 707/827 |

\* cited by examiner

Primary Examiner — Tarek Chbouki
(74) Attorney, Agent, or Firm — BainwoodHuang

(57) ABSTRACT

A technique, which involves participation by electronic circuitry of a data storage array, obtains configuration change information from host devices which are constructed and arranged to store data into and load data from the data storage array. In particular, the technique involves receiving a set of change notices from a set of host devices. Each change notice is received by the electronic circuitry of the data storage array when a respective host device of the set of host devices undergoes a configuration change. The technique further involves providing a set of requests from the electronic circuitry of the data storage array to the set of host devices based on the set of change notices. The technique further involves acquiring configuration change information from the set of host devices in response to the set of requests.

23 Claims, 5 Drawing Sheets

OBTAINING CONFIGURATION INFORMATION FROM HOST DEVICES WHICH STORE DATA INTO AND LOAD DATA FROM A DATA STORAGE ARRAY

BACKGROUND

A typical data storage array includes one or more storage processors and an assembly of disk drives. During operation, each storage processor stores data into and loads data from the disk drive assembly on behalf of one or more external host (or server) devices.

One conventional data storage array offers a management utility which enables an administrator to monitor and control various aspects of the data storage array. The management utility includes a lower-level object manager which communicates with array software that maintains a database of Initiator records, i.e., records representing all of the physical connections between SCSI (small computer system interface) devices and ports of the data storage array. The management utility further includes a provider module which operates as a front-end to the lower-level object manager.

During operation, the provider module periodically obtains an identification of all of the physical connections from the lower-level object manager which retrieves this information from the database of Initiator records. Upon receipt of such identification, the provider module polls all of the physical connections leading to all of the external host devices for current configuration information. In response to such polling, all of the external host devices provide their current configuration information back to the data storage array. The provider module then is able to determine whether any of the external host devices have made a configuration change to a physical connection based on a comparison between the current configuration information and earlier-received configuration information from the external host devices. For example, a particular external host device may have effectuated a LUN (logical unit number) mapping change since the last time the provider module polled that external host device.

The provider module displays any detected configuration changes to the administrator (i.e., on a computer display). A product which operates in a manner similar to that described above is a utility of the Navisphere® Management Suite which is provided by EMC Corporation of Hopkinton, Mass.

SUMMARY

The above-described conventional management utility provides a thorough and comprehensive approach to acquiring configuration information from the external host devices, and may be well-suited for a variety of conventional situations. However, some data storage array customers may wish to scale the number of external host devices to significantly high numbers (e.g., hundreds or even thousands of external host devices). Unfortunately, as the number of external host devices increases, the burden of periodically polling all of the external host devices for configuration information increases significantly.

Moreover, if the conventional management utility is almost at full capacity, it may not be possible to add more external host devices as well as concurrently maintain the same polling interval. That is, in situations in which there are already an excessively large number of external host devices relative to existing processing power limitations, it may be difficult or impossible for the management utility to finish polling all of the external host devices in a targeted amount of time (e.g., one minute, five minutes, etc.). Unfortunately, the only convenient solution in such situations may be to increase the polling period for polling all of the external host devices and risk missing timely detection and reporting of a configuration change.

In contrast to the above-described conventional polling approach which involves polling all physical connections and receiving current configuration information from all of the external host devices at periodic intervals, an improved technique is directed to polling only hosts which have undergone a configuration change. Such a 'smart polling' technique alleviates the need to periodically poll all hosts some of which have not undergone a configuration change. Rather, each poll of a host which has undergone a configuration change is efficient in the sense that it retrieves meaningful information which includes some changed information. Moreover, the improved technique scales well in the sense that additional hosts do not necessarily increase the polling burden. To the contrary, the polling burden is affected by the frequency of undergoing configuration changes. As a result, particular polling interval targets/goals that are set by a user in order to minimize time to detect configuration changes (e.g., completing a poll of only hosts with configuration changes in one minute, five minutes, etc.) are easily achievable.

One embodiment is directed to a technique of obtaining configuration change information from host devices which are constructed and arranged to store data into and load data from the data storage array. The technique involves receiving a set of change notices from a set of host devices. Each change notice is received by electronic circuitry of the data storage array when a respective host device of the set of host devices undergoes a configuration change. The technique further involves providing a set of requests from the electronic circuitry of the data storage array to the set of host devices based on the set of change notices. The technique further involves acquiring configuration change information from the set of host devices in response to the set of requests. Such a 'smart polling' technique alleviates the need to communicate with all of the host devices. Rather, the electronic circuitry needs to communicate only with the set of host devices (i.e., one or more host devices which have recently undergone a configuration change). Accordingly, the polling burden on the electronic circuitry is significantly less than a conventional polling approach which involves polling all external host devices.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved techniques are directed to polling only host devices which have undergone a configuration change. Such techniques alleviate the need to periodically poll all host devices some of which have not undergone a configuration change. That is, each poll is efficient in the sense that it retrieves meaningful information which includes some changed information. Furthermore, such techniques scale well in the sense that additional external host devices do not necessarily increase the polling burden. Rather, the polling burden is affected by the frequency of undergoing configuration changes. Accordingly, particular polling interval targets/goals (e.g., completing a poll of changed host devices in one minute) are more easily achievable.

Figure 1:
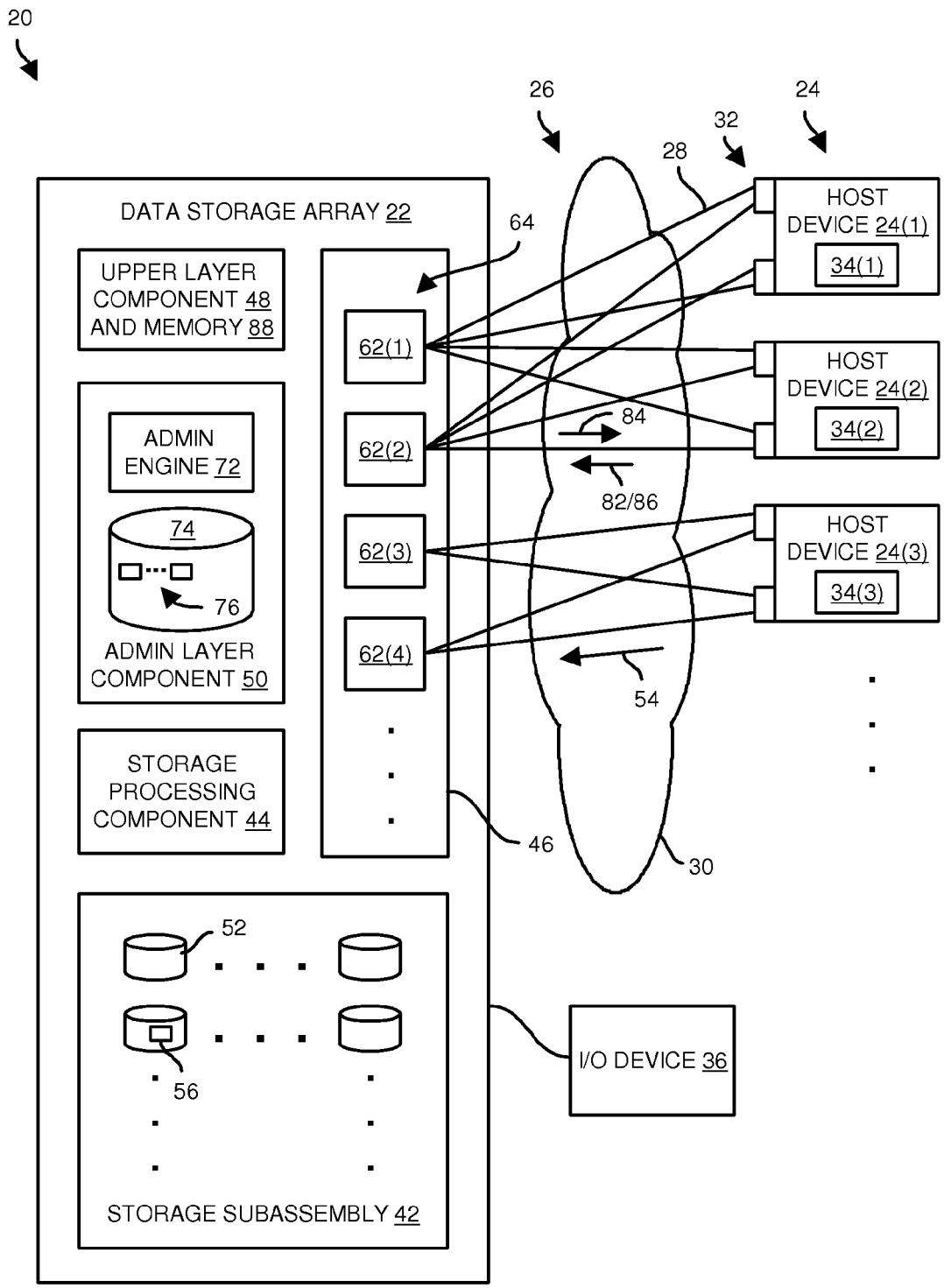
FIG. 1 is a block diagram of a data storage environment in which configuration information is effectively obtained by polling only host devices which have undergone configuration changes.

FIG. 1 shows a data storage environment 20 in which there is polling of only host devices which have undergone a configuration change. The data storage environment 20 includes a data storage array 22, host devices 24(1), 24(2), 24(3), . . . (collectively, host devices 24) and a communications fabric 26 which enables the data storage array 22 and the host devices 24 to communicate electronically. Such an environment 20 is able to take the form of a SAN (storage area network), LAN (local area network), or combination thereof.

Although the communications fabric 26 shows individual point-to-point pathways 28 between the data storage array 22 and the host devices 24, it should be understood that a variety of communications media are suitable for use (e.g., copper, fiber optic, wireless, combinations thereof, etc.). Additionally, as illustrated by the cloud 30, a variety of alternative topologies (e.g., nodal, hub and spoke, ring, irregular hops, combinations thereof, etc.) and communications protocols (TCP/IP, block-based, etc.) are suitable for use as well.

Each host device 24 includes multiple host bus adapters (HBAs) 32 which connect that host device 24 to the data storage array 22 through the communications fabric 26. Examples of suitable HBAs 32 include SCSI, Fibre Channel, eSATA, IDE, Ethernet, FireWire, and USB devices among others.

Each host device 24 further includes a respective host agent 34 which is constructed an arranged to provide configuration information to the data storage array 22. As will be explained in further detail shortly, the configuration information provided by the host agents 34 (e.g., see host agents 34(1), 34(2), 34(3), . . . ) is maintained by the data storage array 22 during array operation.

By way of example only, the data storage environment 20 further includes an I/O device 36 which provides management access to a user. The I/O device (or subassembly) 36 serves as a data storage system management interface that enables a user to control the data storage environment 20. In some arrangements, the I/O device 36 connects directly to the data storage array 22 (e.g., as a console). In other arrangements, the I/O device 36 connects to the data storage array 22 through the communications fabric 26. As yet another alternative, the user utilizes a user interface on one of the host devices 24 as the I/O device 36.

The data storage array 22 includes a storage subassembly 42, a storage processing component 44, a host interface 46, an upper layer component 48 and an admin layer component 50. The storage processing component 44 (e.g., electronic circuitry operating as one or more storage processors) is constructed and arranged to process data storage and retrieval requests 54 from the host devices 24. The storage subassembly 42 is constructed and arranged to store host data 56 on behalf of the host devices 24 in a non-volatile manner.

The host interface 46 is configured to provide access to the data storage array 22 from external locations (from the host devices 24, from the I/O device 36, etc.). Along these lines, the host interface 46 includes multiple ports 62(1), 62(2), 62(3), 62(4), . . . (collectively, ports 62) which are constructed and arranged to connect with the communications fabric 26. In particular, each port 62 is capable of communicating with one or more host devices 24. For example, port 62(1) communicates with multiple HBAs 32 of each host device 24(1), 24(2) through respective communications pathways 28 of the fabric 26. Similarly, port 62(2) communicates with multiple HBAs 32 of each host device 24(1) and 24(2). Accordingly, the data storage array 22 is able to provide high availability, e.g., load balancing and fault tolerant redundancy.

In some arrangements, the upper layer component 48 and the admin layer component 50 are formed by one or more specialized applications running on the same electronic circuitry that carries out the data storage operations for the array 22, i.e., the components 48, 50 run on the same processors that form the storage processing component 44. In other arrangements, the upper layer component 48 and the admin layer component 50 reside on electronic circuitry which is separate from the storage processing circuitry.

As further shown in FIG. 1, the admin layer component 50 includes a specialized admin engine 72 (e.g., a back-end object manager module, a lower-level object manager in combination with the array software, etc.) and a database 74 of records 76. The admin engine 72 is constructed and arranged to maintain the database 74 of records 76 so that the records 76 accurately represent particular operating aspects of the data storage array 22, e.g., physical connections between particular ports 62 of the data storage array 22 and the HBA devices 32 of the host devices 24. The upper layer component 48 is constructed and arranged to access to the admin layer component 50 as well as provide a graphical user interface (GUI) to a user through the I/O device 36.

Particular operating details will now be provided with reference to FIG. 1. During operation, the storage processing component 44 carries out data storage and retrieval requests 54 on behalf of the host devices 24. Such requests 54 preferably include standard load and store operations (e.g., READ, WRITE, READ-MODIFY-WRITE, etc.).

Furthermore, when a new host device 24 is added to the environment 20 and occasionally when an existing host device 24 undergoes a configuration change, the host agent 34 running on that host device 24 sends a change notice message 82 to the data storage array 22. Preferably, the change notice message 82 resides in a standard communication between that host device 24 and the array 22, i.e., in a manner which leverages existing standard in-band communication protocols thus alleviating the need to introduce a new proprietary format. The data storage array 22 (either the admin engine 72 or the array software) receives the change notice message 82 and modifies a particular database record 76 corresponding to a physical connection 28 to that host device 24.

During a particular polling time interval (e.g., one minute, five minutes, etc.), the data storage array 22 may receive other change notice messages 82 from the same host device 24 or perhaps different host devices 24 in response to other configuration changes. In response to each change notice message 82, the data storage array 22 makes an appropriate modification to its database 74.

At the end of the polling time interval, the upper layer component 48 asks the admin layer component 50 to identify which host devices 24 have recently undergone a configuration change. The admin engine 72 identifies these host devices 24 to the upper layer component 48 by accessing the database 74. The upper layer component 48 then sends requests 84 for configuration information only to those host devices 24 through the host interface 46. That is, the upper layer component 48 'polls' only the host devices 24 which have undergone a configuration change.

When a host device 24 receives a request 84 for configuration information, the host agent 34 of that host device 24 responds to the request 84 with its current configuration information 86. The upper layer component 48 receives the configuration information 86 and stores the configuration information 86 in memory 88 in a persistent manner. The upper layer component 48 also makes the newly received configuration information 86 available to the user through the I/O device 36.

This process continues in an ongoing manner (e.g., each minute) so that the data storage array 22 remains apprised of configuration changes in the data storage environment 20. Since the upper layer component 48 only polls the host devices 24 which have undergone a configuration change, there are likely only a few requests 84 and responses 86 to be processed since host devices 24 typically do not make configuration modifications very often. Accordingly, there is a comparatively lighter polling burden vis-à-vis conventional polling approaches which poll all external host devices regardless of whether a host has undergone a configuration change. Further details will now be provided with reference to FIG. 2.

Figure 2:
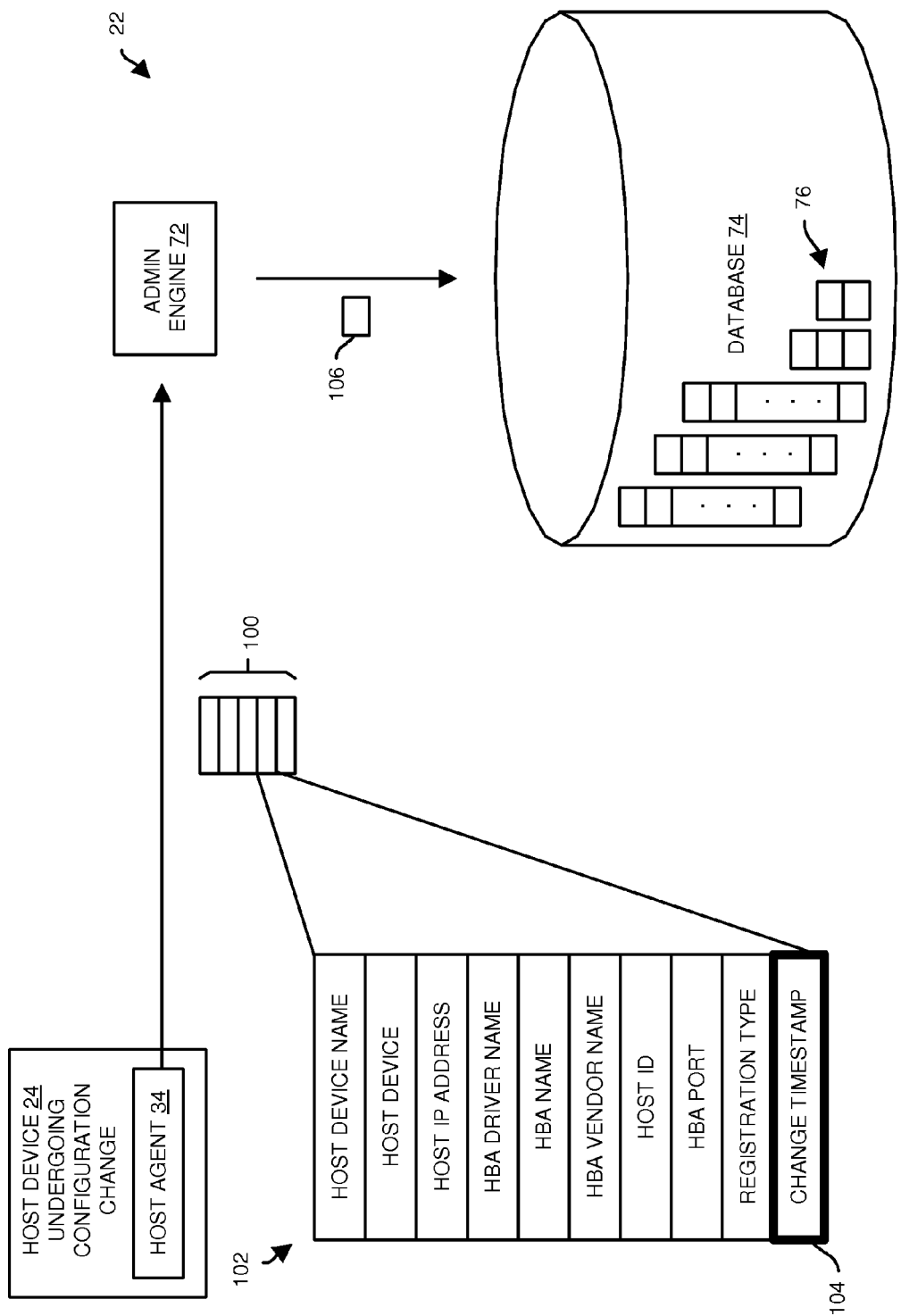
FIG. 2 is a block diagram of a process for updating a database of records which is utilized by a data storage array of the data storage environment of FIG. 1.

FIG. 2 is a block diagram which illustrates a process for updating the database 74 of records 76. As shown in FIG. 2, when a host device 24 undergoes a configuration change, the host agent 34 running on the host device 24 sends a communication 100 containing a framed block of host data 102 to the data storage array 22 (also see the change notice message 82 of FIG. 1). A suitable format for this block of host data 102 is a standard format such as CTLD (Control, Tag/Type, Length and Data) encoding, among others.

One of the fields within the framed block 102 is a change timestamp field 104. The value within this field 104 indicates whether the host device 24 has undergone a configuration change. In some arrangements, the host agent 34 may include a non-null value (e.g., a set bit or bits) within this field 104 to indicate that a configuration change has occurred (i.e., a change notice) and a null value to indicate that no configuration change has occurred (or vice versa).

In other arrangements where the clocks of the host device 24 and the array 22 are synchronized, the host agent 34 places the time of the last configuration change in the change timestamp field 102 so that, when the represented time is after the last polling time, the array 22 knows that a configuration change has occurred at the host device 24. If the represented time is before the last polling time, the array 22 knows that no configuration change has occurred since receiving a prior communication 100. Other arrangements are suitable for use as well (e.g., specific messages, custom bit patterns, and so on).

Upon receipt of the communication 100, the storage array 22 updates its database 74. In particular, the storage array 22 stores timestamp information 106 in a timestamp field of the record 76 which corresponds to the host device 24 (e.g., the record 76 representing a particular communications pathway 28 leading to the host device 24). At this same time, the storage array 22 is capable of storing other information contained within the block 102 in that record 76 (see FIG. 2 for illustrative examples of such information).

It should be understood that the storage array 22 alternatively may simply set a bit of that record 76, i.e., a 'change' bit, to indicate that a host device 24 has undergone a configuration change. However, storing timestamp information 106 in the database record 76 is preferable since it alleviates the need to reset the 'change' bit in a subsequent operation.

It should be further understood that the data block 102 informing the data storage array 22 of a configuration change is capable of being a notification which is sent from the host agent 34 to the array 22 specifically in response to the host device 24 undergoing the configuration change. Alternatively, the data block 102 informing the data storage array 22 of a configuration change is capable of being included in a routine transmission which is sent from the host agent 34 to the data storage array 22 for some other purpose (e.g., the change notice 82 rides piggy-back with other notifications within the data block 102). In either situation, the change notice 82 preferably travels in an 'in-band' manner through the communications pathways 28 (e.g., using the same protocols as other routine host/array communications). Although 'out-of-band' messaging is acceptable for use, sending the change notices 82 through such secure pathways alleviates the need for special changes to a computer network (e.g., see the cloud 30 in FIG. 1) or other parts of the communications infrastructure that could otherwise weaken or compromise security of the data storage environment 20. Further details will now be provided with reference to FIG. 3.

Figure 3:
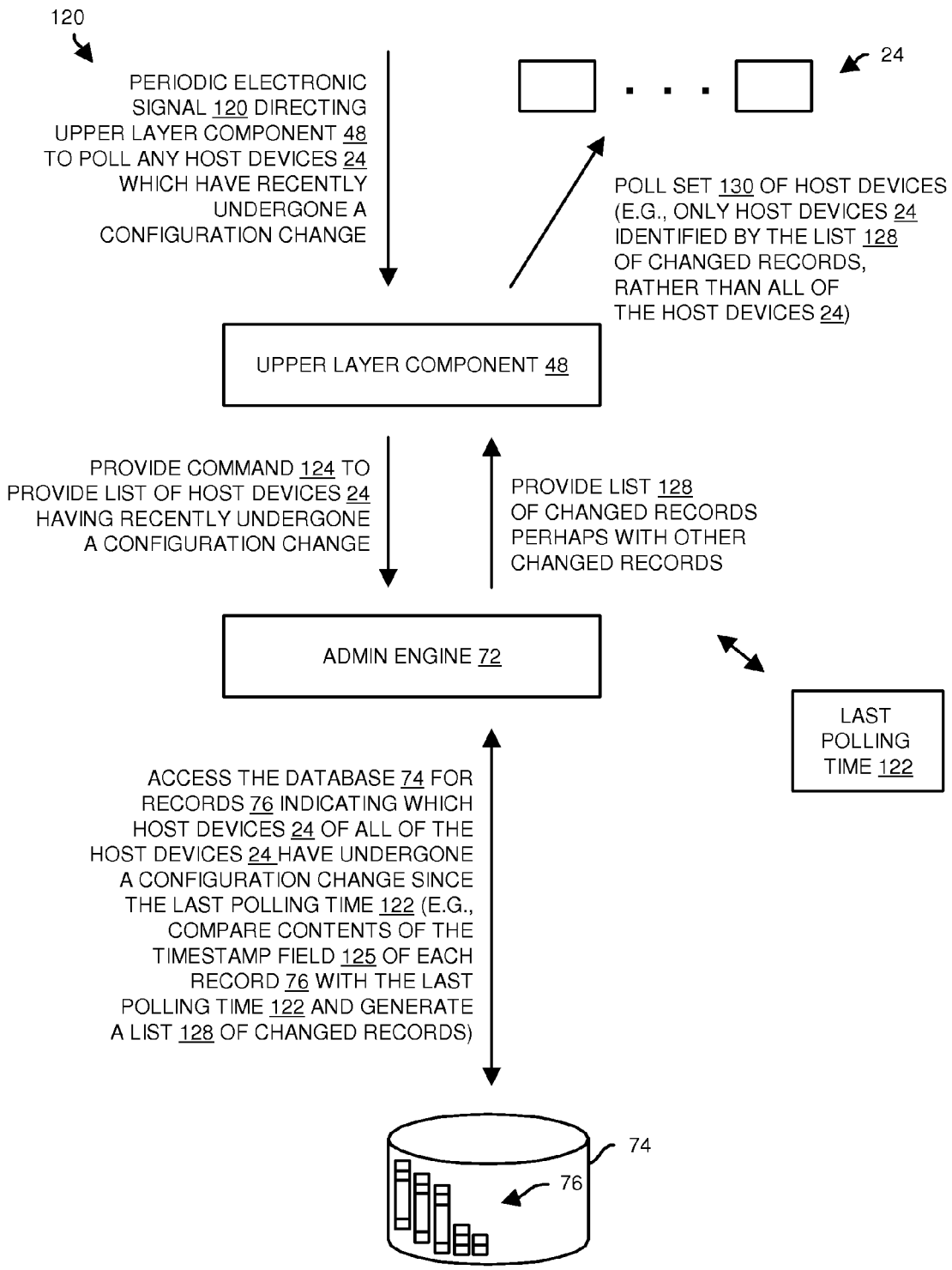
FIG. 3 is a block diagram of a process for detecting which host devices of the data storage environment of FIG. 1 have undergone a configuration change.

FIG. 3 shows a process 120 for detecting which host devices 24 have undergone a configuration change and thus should be 'smartly polled' for configuration information. It should be understood that the process 120 continues in an ongoing manner, e.g., during a poll period or cycle. To this end, the upper layer component 48 periodically receives an electronic signal 120 to poll host devices 24 which have recently undergone a configuration change. Furthermore, the last polling time 122 is available and routinely updated.

Each time the upper layer component 48 receives the signal 120, a new poll cycle begins. Here, the upper layer component 48 provides a command 124 to the admin engine 72 (also see the admin layer component 50 of FIG. 1). The command 124 directs the admin engine 72 to provide a list of changed records. In response to the command 124, the admin engine 72 accesses the database 74 for records 76 which indicate those host devices 24 which have undergone a change since the last polling time 122. In some arrangements, the upper layer component 48 receives any records which have been detected to have changed (i.e., not just records with changes in their timestamp fields), and the upper layer component 48 determines which of those received records have a changed timestamp in the record's timestamp field 125 based on a comparison between the contents of the records' timestamp fields 125 and the last polling time 122. To this end, the upper layer component 48 may simply compare the contents of the timestamp field 125 of each record 76 with the last polling time 122. If the timestamp is ahead of (i.e., chronologically after) the last polling time 122, the admin engine 72 concludes that the host device 24 corresponding to that record 76 has undergone a configuration change since the last polling time and adds the record to a list 128 of changed records. However, if the timestamp is chronologically before the last polling time 122, the admin engine 72 concludes that the host device 24 corresponding to that record 76 has not undergone a configuration change since the last polling time and does not add the record to the list 128 of changed records. Additionally, in these arrangements, the upper layer component 48 updates the last polling time 122 with the current time, i.e., the current time is now the new last polling time 122.

In other arrangements, the upper layer component 48 receives only the records which have changes in their timestamp fields from the admin engine 72 (i.e., just records with changes in their timestamp fields). Here, after the admin engine 72 has identified all of the host devices 24 which have undergone a configuration change since the last polling time 122, the admin engine 72 provides the list 128 of changed records to the upper layer component 48. Additionally, the admin engine 72 updates the last polling time 122 with the current time, i.e., the current time is now the new last polling time 122.

The upper layer component 48 then polls only the set 130 of host devices 24 on the list 128. This polling burden is typically very small since host devices 24 do not often undergo configuration changes. Accordingly, the polling period may be kept to a relatively short amount of time (e.g., one minute, five minutes, etc.) thus minimizing the risk that a configuration change will go undetected for more an extended period of time. Further details will now be provided with reference to FIG. 4.

Figure 4:
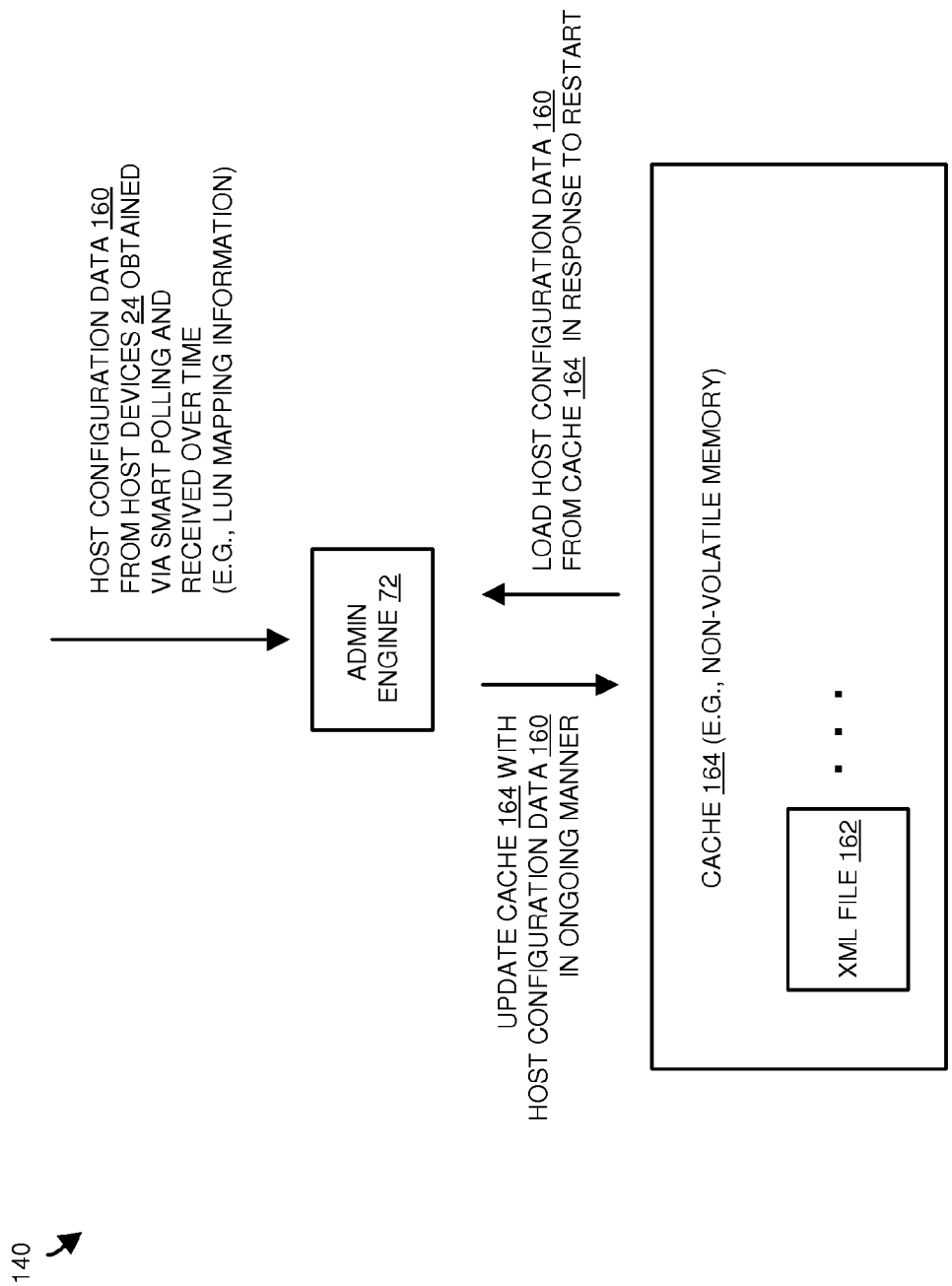
FIG. 4 is a block diagram of a technique for caching configuration information for speedy startup after a restart.

FIG. 4 shows a process 140 for caching host configuration data 160 obtained through smart polling to alleviate the need to poll all of the host devices 24 after a restart. Such operation greatly speeds up startup time of the data storage array 22.

To this end, the upper layer component 48 is constructed and arranged to the cache host configuration data 160 such as logical unit number (LUN) mapping information in one or more mechanisms capable of static representation. An example includes extensible markup language (XML) files 162 which are maintained in a non-volatile cache 164, e.g., also see the memory 88 in FIG. 1. Thus, upon a restart of the data storage array 22, the upper layer component 48 simply reads the host configuration data from the cache 164 and does not need to poll the host devices 24 for this information. Rather, the array 22 continues to smartly poll only host devices 24 that have sent change notices 82 as described earlier with reference to FIGS. 1 through 3.

In one arrangement, the admin engine 72 is constructed and arranged to store the LUN mapping information of all of the host devices 24 in a single XML file 162. Such an arrangement provides convenient initial parsing and compression, but may require updating the whole XML file even if there is only one host device change.

In another arrangement, the admin engine 72 constructed and arranged to store the LUN mapping information of all of the host devices 24 in separate XML files 162 (see ellipsis in the cache 164 of FIG. 4). That is, there is one XML file per host device 24. Such an arrangement is easy to update, but requires the array 22 to parse the many XML files 162 upon startup, i.e. as many XML files 162 as there are host devices 24. Further details will now be provided with reference to FIG. 5.

Figure 5:
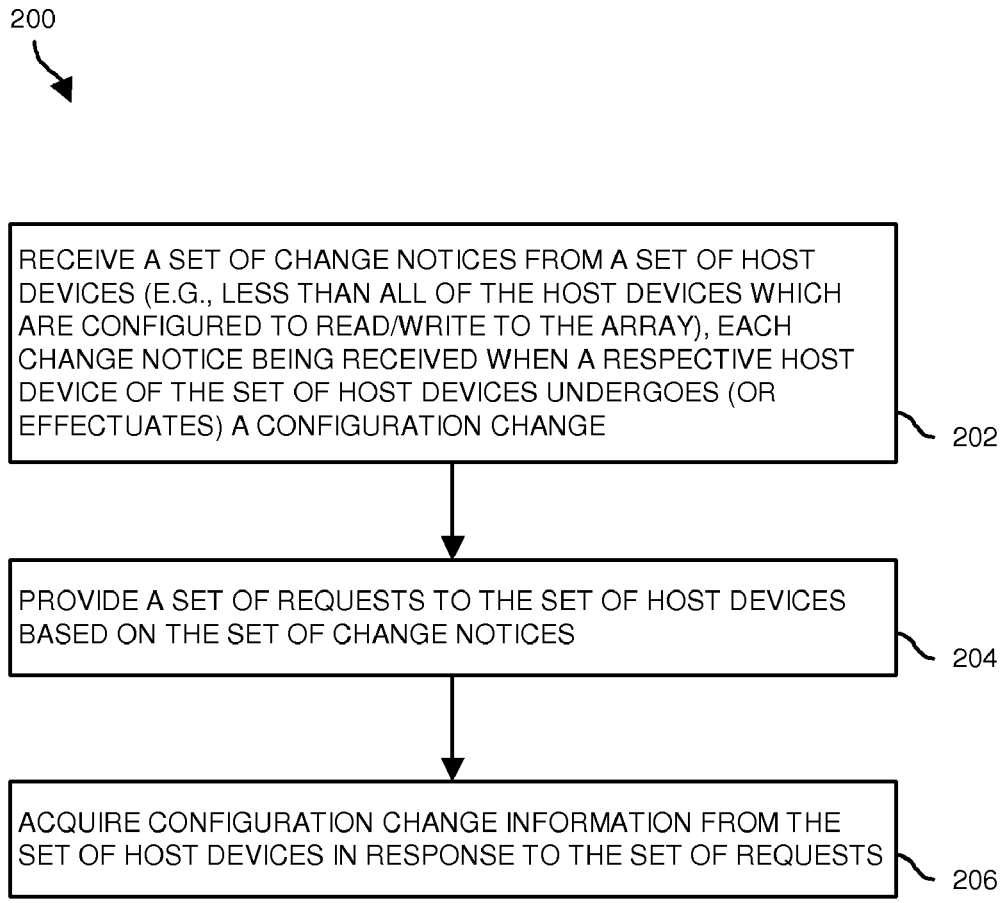
FIG. 5 is a flowchart of a procedure which is performed by the data storage array of the data storage environment of FIG. 1.

FIG. 5 is a flowchart of a procedure 200 which is performed by the data storage array 22 in an ongoing manner. In step 202, the data storage array 22 receives a set of change notices 82 from a set of host devices 24 (also see FIG. 1). These change notices 82 are acquired since the last smart polling event when respective host devices 24 undergo a configuration changes.

In step 202, the data storage array 22 provides a set of requests 84 to the set of host devices 24 (e.g., one or more hosts but less than all of the host devices 24 in the environment 20) based on the set of change notices 82. Recall that the data storage array 22 sends requests 84 only to those host devices 24 which have undergone a configuration change thus minimizing the polling burden.

In step 204, the data storage array 22 acquires current configuration information 86 (i.e., configuration change information) from the set of host devices 24 in response to the set of requests 84. This information is stored in the database 74 as well as rendered to the user through the I/O device 36 (FIG. 1).

The procedure 200 is continued in an ongoing manner, e.g., repeated each polling period as defined by a standard polling time such as one minute. Such 'smart polling' alleviates the need to communicate with all of the host devices 24. Rather, the array 22 needs to communicate only with the host devices 24 which have recently undergone a configuration change.

As mentioned above, an improved technique is directed to polling only host devices 24 which have undergone a configuration change. Such a 'smart polling' technique alleviates the need to periodically poll all host devices 24 some of which have not undergone a configuration change. Rather, each poll of a host device 24 which has undergone a configuration change is efficient in the sense that it retrieves meaningful information which includes some changed information. Moreover, the improved technique scales well in the sense that additional host devices 24 do not necessarily increase the polling burden. To the contrary, the polling burden is affected by the frequency of undergoing configuration changes. Accordingly, particular polling interval targets/goals that are set by a user in order to minimize time to detect configuration changes (e.g., completing a poll of changed host devices in one minute, five minutes, etc.) are easily achievable.

While various embodiments of the invention have been particularly shown and described, it will be understood by those skilled in the art that various changes in form and details may be made therein without departing from the spirit and scope of the invention as defined by the appended claims.

For example, it should be understood that the admin layer component 50 is capable of being formed by a bottom-half of a management utility in combination with operating environment software of the storage array. In such arrangements, the joint presence of these parts serves as the admin layer component 50. Portions of the Navisphere® Management Suite and the FLARE® operating environment provided by EMC Corporation of Hopkinton, Mass. are examples of a management utility and operating environment, one or both of which, are capable of being enhanced to operate either individually or together as the admin layer component 50.

In other arrangements, the admin layer component 50 operates separately from the operating environment. In such arrangements, the admin layer component 50 preferably is fully self-sustained as a module running above the operating environment.

Additionally, it should be understood that the above-described operation covers situations in which the data storage array 22 polls host devices 24 for change data. It should be understood that the techniques described above are also suitable for use in other situations such as when an error pertaining to storage is detected by a host device 24, among others. Such modifications and enhancements are intended to belong to various embodiments of the invention.

What is claimed is:

1. In a processor of a data storage array, a method of obtaining configuration change information from host devices, the method comprising:

receiving, at the data storage array, a set of change notices from a set of the host devices, each host device being constructed to perform data storage and retrieval input/output (I/O) operations on the data storage array over secure communications pathways of a communications fabric via a plurality of host bus adapters of that host device, each change notice being received by the processor of the data storage array when a respective host device of the set of host devices undergoes a configuration change;

providing a set of requests from the processor of the data storage array to the set of host devices based on the set of change notices, the requests of the set of requests being sent only to a subset of the host devices which have undergone a configuration change during a most recent polling interval; and acquiring, at the data storage array, configuration change information from the set of host devices in response to the set of requests;

wherein acquiring the configuration change information from the set of host devices in response to the set of requests includes obtaining logical unit number (LUN) mapping information from the set of host devices;

wherein providing the set of requests includes periodically polling the subset of the host devices which have undergone a configuration change during the most recent polling interval, the host devices of the subset each being identified by a respective timestamp associated with a change notice of the set of change notices received during the most recent polling interval.

2. A method as in claim 1 wherein the processor runs an administrative application that stores a database having records; and wherein providing the set of requests further includes (i) changing a set of records of the database in response to the set of change notices from the set of host devices, and (ii) sending the set of requests from the processor to the set of host devices based on the changed set of records of the database.

3. A method as in claim 2 wherein sending the set of requests from the processor of the data storage array to the set of host devices based on the changed set of records of the database includes:

accessing the database to obtain a list of changed records, the list of changed records corresponding to the subset of the host devices which have undergone a configuration change during the most recent polling interval; and for each changed record on the list, transmitting a request from the processor to a particular host device corresponding to that changed record.

4. A method as in claim 3 wherein changing the set of records of the database in response to the set of change notices from the set of host devices includes:

for each record of the set of records, updating a timestamp field of that record with a new timestamp field to indicate that the record has changed.

5. A method as in claim 4 wherein accessing the database to obtain a list of changed records includes:

for each record of the database, (i) reading a timestamp field of that record, (ii) comparing the timestamp field to a last polling time of the data storage array, the last polling time representing a beginning of the most recent polling interval, and (iii) adding that record to the list of changed records when the timestamp field represents a time after the last polling time and not adding that record to the list of changed records when the timestamp field represents a time before the last polling time.

6. A method as in claim 3 wherein a computer network connects the set of host devices to the data storage array; and wherein receiving the set of change notices from the set of host devices includes incrementally receiving each change notice in an in-band manner through the set of secure communications pathways.

7. A method as in claim 6 wherein the data storage array and the host devices form a data storage system; and wherein the method further comprises:

on an input/output subsystem, providing a data storage system management interface to a user to enable the user to control the data storage system as the data storage and retrieval operations are carried out.

8. A method as in claim 6, further comprising:

caching, at the data storage array, LUN mapping information for multiple host devices in a single extensible markup language (XML) file maintained in non-volatile memory; and reloading, at the data storage array, the LUN mapping information from the single XML file maintained in the non-volatile memory in response to a restart operation of the data storage array.

9. A method as in claim 6, further comprising:

caching, at the data storage array, LUN mapping information for multiple host devices in multiple extensible markup language (XML) files maintained in non-volatile memory, each XML file corresponding to a respective host device of the multiple host devices; and reloading, at the data storage array, the LUN mapping information from the multiple respective extensible markup language (XML) files maintained in non-volatile memory in response to a restart operation of the data storage array.

10. A method as in claim 1, further comprising:

operatively connecting the data storage array to the set of host devices via a set of ports of the data storage array, wherein each port operatively connects to multiple host devices via the communication fabric, wherein the act of receiving the set of change notices includes, for each of the set of host devices:

receiving, via a respective port of the set of ports, information that indicates whether the configuration of the respective host device has changed;

receiving, via the respective port of the set of ports, information identifying the respective host device; and receiving, via the respective port of the set of ports, information about a host bus adapter of the respective host device that sends the respective change notice.

11. A method as in claim 10, wherein, for each of the set of change notices, the respective change notice is received as a framed block of host data provided with CTLD (Control, Tag/Type, Length, and Data) encoding.

12. A method as in claim 1 wherein:

the data storage array is configured to process data storage and retrieval requests received from the host devices over a storage area network;

receiving the set of change notices from the set of host devices includes receiving the set of change notices via the storage area network;

providing the set of requests to the set of host devices includes sending the set of requests via the storage area network; and acquiring configuration change information from the set of host devices includes receiving the configuration change information via the storage area network.

13. A method as in claim 1 wherein:

receiving the set of change notices includes receiving each change notice of the set of change notices from a respective host device in response to the respective host device undergoing the configuration change; and periodically polling the subset of the host devices includes, periodically:

at an end of a periodic interval, selecting all host devices for which a change notice was received since a beginning of the periodic interval;

generating the set of requests by creating a request for configuration information directed at each respective selected host device; and sending the generated set of requests to the respective selected host devices without sending any request to non-selected host devices.

14. An apparatus to obtain configuration change information from host devices which are constructed and arranged to store data into and load data from a storage subassembly, the apparatus comprising:

a host interface;

a set of processors, coupled to the host interface;

the storage subassembly, coupled to the host interface, the storage subassembly being constructed and arranged to store and load data on behalf of host devices by performing data storage and retrieval input/output (I/O) operations, each host device being connected to the host interface over secure communications pathways of a communications fabric via a plurality of host bus adapters of that host device;

memory, coupled to the set of processors, the set of processors and memory configured to form— an admin layer component constructed and arranged to (i) maintain configuration data relating to the host devices and the storage subassembly and (ii) receive a set of change notices from a set of host devices, each change notice being received when a respective host device of the set of host devices undergoes a configuration change relative to the storage subassembly; and an upper layer component coupled to the host interface and the admin layer component, the upper layer component being constructed and arranged to (i) provide, through the host interface, a set of requests to the set of host devices based on the set of change notices, the requests of the set of requests being sent only to a subset of the host devices which have undergone a configuration change during a most recent polling interval, and (ii) acquire, through the host interface, configuration change information from the set of host devices in response to the set of requests;

wherein the configuration change information acquired from the set of host devices in response to the set of requests includes logical unit number (LUN) mapping information from the set of host devices;

wherein the upper layer component is further constructed and arranged to, when providing the set of requests, periodically poll the subset of the host devices which have undergone a configuration change during the most recent polling interval, the host devices of the subset each being identified by a respective timestamp associated with a change notice of the set of change notices received during the most recent polling interval.

15. An apparatus as in claim 14 wherein the admin layer component includes an admin engine and a database, the database being constructed and arranged to maintain records relating to the host devices and the storage subassembly, and the admin engine being constructed and arranged to change a set of records of the database in response to the set of change notices from the set of host devices; and wherein the upper layer component, when providing the set of requests to the set of host devices based on the set of change notices, is further constructed and arranged to send, through the host interface, the set of requests to the set of host devices based on the changed set of records of the database.

16. An apparatus as in claim 15 wherein the upper layer component, when sending the set of requests to the set of host devices based on the changed set of records of the database, is constructed and arranged to:

obtain, from the admin engine, a list of changed records, the list of changed records corresponding to the subset of the host devices which have undergone a configuration change during the most recent polling interval; and for each changed record on the list, transmit a request to a particular host device corresponding to that changed record through the host interface.

17. An apparatus as in claim 16 wherein the admin engine, when changing the set of records of the database in response to the set of change notices from the set of host devices, is constructed and arranged to:

for each record of the set of records, update a timestamp field of that record with a new timestamp field to indicate that the record has changed.

18. An apparatus as in claim 17 wherein the upper layer component, when obtaining the list of changed records from the admin engine, is constructed and arranged to:

direct the admin engine to query the database by, for each record of the database, (i) reading a timestamp field of that record, (ii) comparing the timestamp field to a last polling time, the last polling time representing a beginning of the most recent polling interval, and (iii) adding that record to the list of changed records when the timestamp field represents a time after the last polling time and not adding that record to the list changed records when the timestamp field represents a time before the last polling time.

19. A data storage array, comprising:

a host interface;

a storage subassembly constructed and arranged to store data into and load data on behalf of host devices through the host interface by performing data storage and retrieval input/output (I/O) operations; and a set of processors constructed and arranged to obtain configuration change information from host devices through the host interface;

memory, coupled to the set of processors, the set of processors and memory configured to form— an admin layer component constructed and arranged to (i) maintain configuration data relating to the data storage array and (ii) receive a set of change notices from a set of host devices through the host interface, each host device of the set of host devices being connected to the host interface over secure communications pathways of a communications fabric via a plurality of host bus adapters of that host device, each change notice being received when a respective host device of the set of host devices undergoes a configuration change relative to the data storage array, and an upper layer component coupled to the host interface and the admin layer component, the upper layer component being constructed and arranged to (i) provide, through the host interface, a set of requests to the set of host devices based on the set of change notices, the requests of the set of requests being sent only to a subset of the host devices which have undergone a configuration change during a most recent polling interval, and (ii) acquire, through the host interface, configuration change information from the set of host devices in response to the set of requests;

wherein the configuration change information acquired from the set of host devices in response to the set of requests includes logical unit number (LUN) mapping information from the set of host devices;

wherein the upper layer component is further constructed and arranged to, when providing the set of requests, periodically poll the subset of the host devices which have undergone a configuration change during the most recent polling interval, the host devices of the subset each being identified by a respective timestamp associated with a change notice of the set of change notices received during the most recent polling interval.

20. A data storage array as in claim 19 wherein the admin layer component includes an admin engine and a database, the database being constructed and arranged to maintain records relating to the data storage array, and the admin engine being constructed and arranged to change a set of records of the database in response to the set of change notices from the set of host devices; and wherein the upper layer component, when providing the set of requests to the set of host devices based on the set of change notices, is further constructed and arranged to send, through the host interface, the set of requests to the set of host devices based on the changed set of records of the database.

21. A data storage array as in claim 20 wherein the upper layer component, when sending the set of requests to the set of host devices based on the changed set of records of the database, is constructed and arranged to:

obtain, from the admin engine, a list of changed records, the list of changed records corresponding to the subset of the host devices which have undergone a configuration change during the most recent polling interval; and for each changed record on the list, transmit a request to a particular host device corresponding to that changed record through the host interface.

22. A data storage array as in claim 21 wherein the admin engine, when changing the set of records of the database in response to the set of change notices from the set of host devices, is constructed and arranged to:

for each record of the set of records, update a timestamp field of that record with a new timestamp field to indicate that the record has changed.

23. A data storage array as in claim 22 wherein the upper layer component, when obtaining the list of changed records from the admin engine, is constructed and arranged to:

direct the admin engine to query the database by, for each record of the database, (i) reading a timestamp field of that record, (ii) comparing the timestamp field to a last polling time, the last polling time representing a beginning of the most recent polling interval, and (iii) adding that record to the list of changed records when the timestamp field represents a time after the last polling time and not adding that record to the list changed records when the timestamp field represents a time before the last polling time.

* * * * *